US010635465B2

(12) United States Patent
Xekalakis et al.

(10) Patent No.: US 10,635,465 B2
(45) Date of Patent: Apr. 28, 2020

(54) APPARATUSES AND METHODS TO PREVENT EXECUTION OF A MODIFIED INSTRUCTION

(71) Applicant: Intel Corporation, Santa Clara, CA (US)

(72) Inventors: Polychronis Xekalakis, San Jose, CA (US); Jamison D. Collins, San Jose, CA (US); Jason M. Agron, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 94 days.

(21) Appl. No.: 14/672,158

(22) Filed: Mar. 28, 2015

(65) Prior Publication Data
US 2016/0283234 A1  Sep. 29, 2016

(51) Int. Cl.
| | |
|---|---|
| *G06F 9/455* | (2018.01) |
| *G06F 9/38* | (2018.01) |
| *G06F 12/0815* | (2016.01) |
| *G06F 12/1027* | (2016.01) |

(52) U.S. Cl.
CPC .......... *G06F 9/455* (2013.01); *G06F 12/0815* (2013.01); *G06F 12/1027* (2013.01); *G06F 9/3834* (2013.01)

(58) Field of Classification Search
CPC .... G06F 9/3834; G06F 9/455; G06F 9/45554; G06F 12/10; G06F 12/0815; G06F 9/4552; G06F 9/3017; G06F 9/30174
See application file for complete search history.

(56) References Cited

U.S. PATENT DOCUMENTS

| | | | |
|---|---|---|---|
| 6,594,821 B1 * | 7/2003 | Banning | G06F 9/3808 703/26 |
| 6,704,925 B1 | 3/2004 | Bugnion | |
| 7,107,580 B2 * | 9/2006 | Zemach | G06F 8/52 717/136 |
| 7,203,944 B1 | 4/2007 | van Rietschote et al. | |
| 7,296,261 B2 | 11/2007 | Witchel et al. | |
| 7,617,088 B1 * | 11/2009 | Bedichek | G06F 9/3017 703/23 |
| 7,774,746 B2 | 8/2010 | Mansfield et al. | |
| 7,822,924 B2 | 10/2010 | Woffinden et al. | |

(Continued)

FOREIGN PATENT DOCUMENTS

CN    102087609 A    6/2011

OTHER PUBLICATIONS

Andrew Tanenbaum, Structured Computer Organization, 1984, Prentice Hall, Second, p. 11.*

(Continued)

*Primary Examiner* — Aimee Li
*Assistant Examiner* — Courtney P Carmichael-Moody
(74) *Attorney, Agent, or Firm* — Nicholson De Vos Webster & Elliott LLP

(57) ABSTRACT

Methods and apparatuses relating to preventing the execution of a modified instruction. In one embodiment, an apparatus includes a hardware binary translator to translate an instruction to a translated instruction, and a consistency hardware manager to prevent execution of the translated instruction by a hardware processor on detection of a modification to a virtual to physical address mapping of the instruction after the translation.

16 Claims, 14 Drawing Sheets

(56) References Cited

U.S. PATENT DOCUMENTS

| | | | |
|---|---|---|---|
| 9,116,729 B2 | 8/2015 | Cooray et al. | |
| 2003/0093775 A1 | 5/2003 | Hilton | |
| 2004/0015675 A1 | 1/2004 | Kyker et al. | |
| 2008/0320286 A1* | 12/2008 | Campbell | G06F 9/30174 712/226 |
| 2010/0030975 A1 | 2/2010 | Murray et al. | |
| 2010/0106479 A1* | 4/2010 | Hieda | G06F 9/455 703/26 |
| 2010/0332808 A1 | 12/2010 | Adl-Tabatabai et al. | |
| 2012/0023307 A1 | 1/2012 | Morris | |
| 2012/0117355 A1 | 5/2012 | Campbell et al. | |
| 2012/0239912 A1* | 9/2012 | Maeda | G06F 12/02 712/226 |
| 2014/0189659 A1 | 7/2014 | Cooray et al. | |
| 2015/0095590 A1* | 4/2015 | Lu | G06F 12/10 711/146 |

OTHER PUBLICATIONS

Office action from U.S. Appl. No. 13/997,694, dated Aug. 22, 2014, 22 pages.
Notice of Allowance from U.S. Appl. No. 13/997,694, dated Mar. 23, 2015, 18 pages.
AMD, "AMD64 Architecture Programmer's Manual Volume 2: System Programming," May 2013, Publication No. 4593, 664 pages.
First Office Action and Search Report from foreign counterpart Chinese Patent Application No. 201280077331.4, dated Sep. 20, 2017, 27 pages. (Translation available only for office action).
International Preliminary Report on Patentability for Application No. PCT/US2012/071880, dated Jul. 9, 2015, 7 pages.
International Search Report for Application No. PCT/US2012/071880, dated Jul. 29, 2013, 3 pages.
Notice of Preliminary Rejection from foreign counterpart Korean Patent Application No. 10-2015-7011970, dated Aug. 18, 2016, 5 pages.
Notice of Preliminary Rejection from foreign counterpart Korean Patent Application No. 10-2015-7011970, dated Feb. 22, 2016, 9 pages.
Written Opinion for Application No. PCT/US2012/071880, dated Jul. 29, 2013, 5 pages.

* cited by examiner

MKIP 0x2000

XCATNE 0x1234000

ACCESS ITLB

MKIP 0x2100

XCATNE 0x2341000

COMMIT @ BAC BLOCKS

CHECK COMPLETES, FAULT DETECTED, SEND ROBid 66 a ROB COMPLETE AND A FAULT

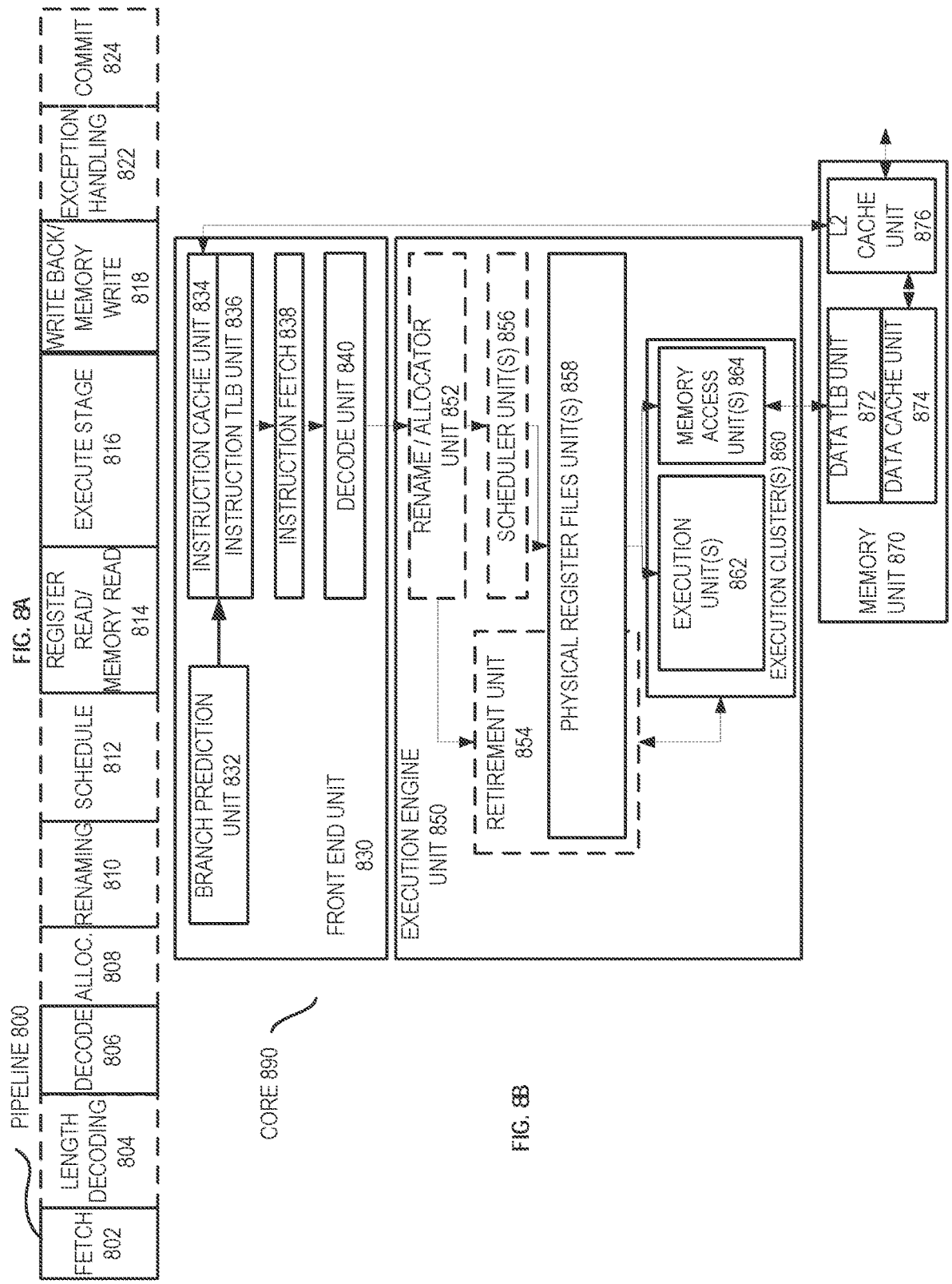

APPARATUSES AND METHODS TO PREVENT EXECUTION OF A MODIFIED INSTRUCTION

TECHNICAL FIELD

The disclosure relates generally to electronics, and, more specifically, an embodiment of the disclosure relates to preventing execution of a modified instruction.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 8A is a block diagram illustrating both an exemplary in-order pipeline and an exemplary register renaming, out-of-order issue/execution pipeline according to embodiments of the disclosure.

FIG. 8B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
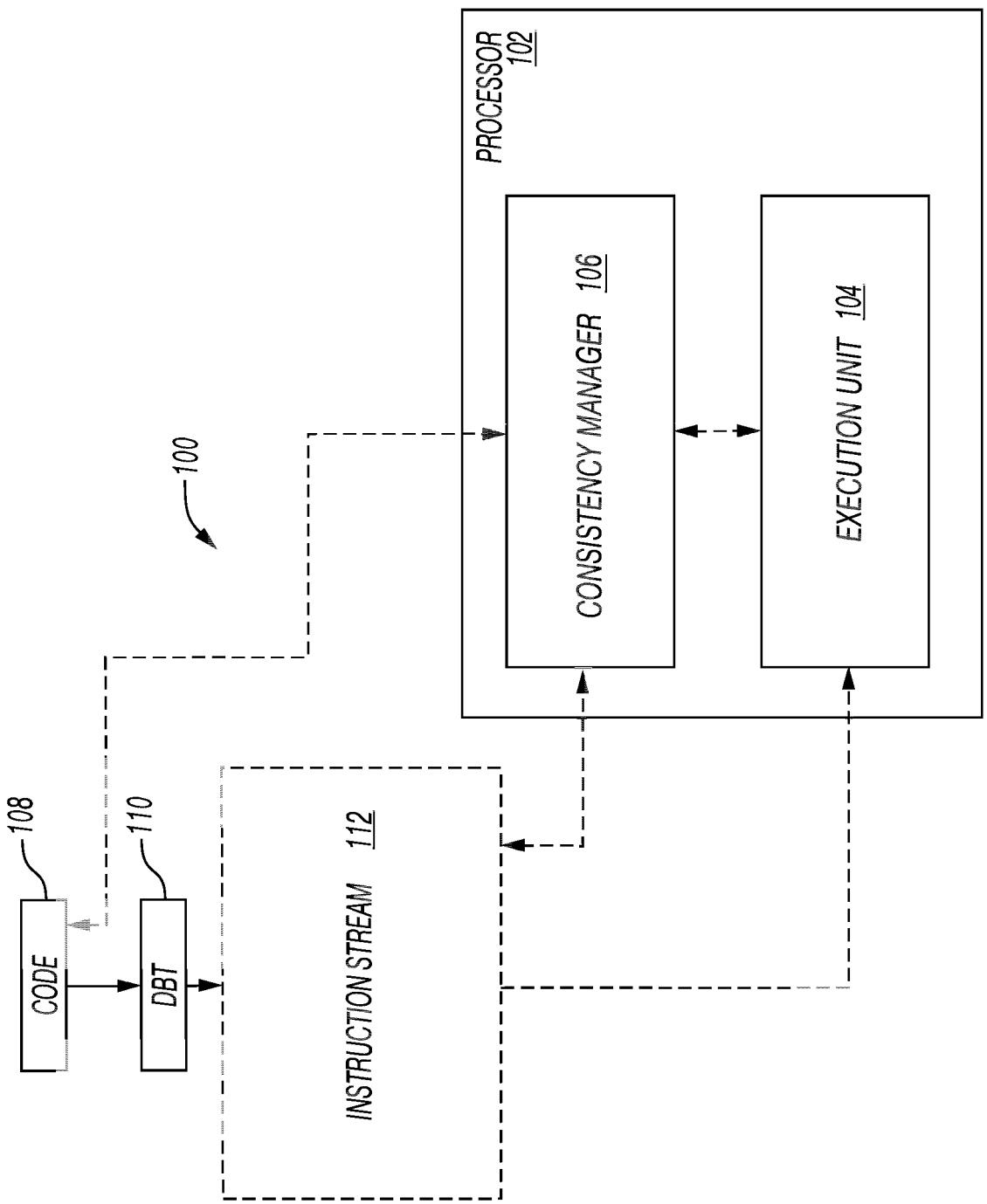
FIG. 1 illustrates a system to prevent execution of a modified instruction according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute instructions to operate on data, for example, to perform arithmetic, logic, or other functions. Code (e.g., software) to be executed on a processor may be translated from one format to another format. A (e.g., dynamic) binary translator may be utilized to translate code (e.g., an instruction) from one format to another format. A binary translator may translate code (e.g., an instruction) from a guest format to a host format. A binary translator may translate an instruction of a first ISA into an instruction of a second ISA. A binary translator may translate (e.g., an x86 format) macro-instruction(s) into micro-instruction(s). An instruction may translate into a plurality of translated instructions, e.g., a one-to-one correspondence is not required in one embodiment. Multiple instructions may translate into one translated instruction or a number of translated instructions that is less than the number of multiple (e.g., untranslated) instructions, e.g., a one-to-one correspondence is not required in one embodiment. A binary translator may translate a software instruction (e.g., in binary code) into a hardware instruction (e.g., in binary code), for example, for execution on a hardware processor. A (e.g., dynamic) binary translator may include hardware, software, firmware, or any combination thereof. A dynamic binary translator (DBT) may translate one instruction (e.g., in source binary code complying with the architecture of a source processor (source architecture)) into a translated instruction (e.g., into target binary code complying with the architecture of a target processor (target architecture)). The dynamic binary translation process may take place during execution of the source binary code (e.g., at run time). Dynamical binary translation may include (e.g., assign) mapping (e.g., translation time mapping) of a virtual address (e.g., page) to a physical address (e.g., page). Dynamic binary translation may include (e.g., assign) mapping (e.g., translation time mapping) of a virtual thread to a physical thread.

In certain embodiments, the (e.g., non-translated) code (e.g., instruction) that was translated (e.g., by binary translation) into translated code (e.g., translated instruction) may be modified after the translation, for example, but the translated code is not (e.g., automatically) modified accordingly. Code (e.g., an instruction) may be self-modifying (self-modified) code (SMC) and/or cross-modifying (cross-modified) code (XMC). Writing data (e.g., via a processor) into a currently executing code segment with the intent of executing that data as code may be referred to as self-modifying code. One processor, or other device (e.g., a device with direct memory access (DMA)), writing data into the currently executing code segment of a second processor with the intent of having the second processor execute that data as code may be referred to as cross-modifying code. Inconsistent code, e.g., translated code (e.g., from a binary translation) that substantively differs from its non-translated version, may cause errors in the execution of the code.

Certain embodiments of this disclosure may use a consistency manager to maintain a consistent (e.g., binary) translation for the translated code (e.g., instruction), for example, with respect to a modification to the untranslated (e.g., original) code. A consistency manager may include hardware, software, firmware, or any combination thereof. A (e.g., hardware) processor may include a consistency manager, e.g., a single consistency manager to manage each core of multiple cores of the processor. In one embodiment, a consistency manager may manage the instructions to be executed by an execution unit(s) of a processor. A consistency manager may detect a modification to the untranslated code (e.g., after the binary translation process has begun and/or completed). A consistency manager may prevent execution of translated (e.g., by binary translation) code (e.g., on an instruction level of granularity) by a processor on detection of a modification to the untranslated code (e.g., after the binary translation). A consistency manager preventing execution of a translated (e.g., by binary translation) instruction may refer to preventing the beginning of execution and/or the completion (e.g., commit) of execution of the translated (e.g., by binary translation) instruction. A consistency manager preventing execution of a translated (e.g., by binary translation) instruction may refer to preventing an execution unit of a processor from executing (e.g., beginning or finishing execution) the translated (e.g., by binary translation) instruction. A consistency manager preventing execution of a translated (e.g., by binary translation) instruction may refer to preventing a scheduler of a processor from scheduling the translated (e.g., by binary translation) instruction for execution. The consistency manager may further schedule the untranslated, modified instruction for execution. Additionally or alternatively, a consistency manager may translate (e.g., with a binary translator) the modified instruction and may then further schedule the modified, translated (e.g., by binary translation) instruction for execution. In one embodiment, a consistency manager may prevent execution of translated (e.g., by binary translation) code (e.g., on an instruction level of granularity) by a processor on detection of a modification to the untranslated code (e.g., after the binary translation) without checking or utilizing a (e.g., data) caching agent. In one embodiment, a data caching agent is separate from an instruction caching agent. In one embodiment, a consistency manager may prevent execution of translated (e.g., by binary translation) code (e.g., on an instruction level of granularity) by a processor on detection of a modification to the untranslated code (e.g., after the binary translation) without checking or utilizing a translation look aside buffer, e.g., a data translation lookaside buffer (dTLB). In one embodiment, a data translation lookaside buffer (dTLB) is separate (e.g., separately managed) from an instruction translation lookaside buffer (iTLB).

A first instruction from a first code (e.g., software application) may be at a first virtual address (e.g., first virtual page of instructions) and a second instruction from a second code (e.g., software application) may be at a second virtual address (second virtual page of instructions). First instruction and the second instruction may have the same virtual address or page (e.g., space). A virtual address may be a linear address. First virtual address (e.g., page) may map to a first physical address (e.g., page) and second virtual address (e.g., page) may map to a second physical address (e.g., page). Mapping may occur during a process referred to as translation. That address translation of a linear address to a physical address (or of a physical address to a linear address) may be different from the binary translation (e.g., by a binary translator) discussed herein.

As one example, a first virtual address (e.g., page) may be referred to as "A" and second virtual address (e.g., page) may be referred to as "A" here, e.g., the same virtual address (e.g., page). First virtual address (e.g., page) may map to a physical address (e.g., page) referred to as "X" and second virtual address (e.g., page) may map to a physical address (e.g., page) referred to as "Y" (e.g., a different location than X). A (e.g., dynamic) binary translator may translate instruction(s) at virtual address(es) (e.g., based on its mapping to a particular physical address). If a first instruction is executing that mapped (e.g., at binary translation time) virtual address (e.g., page) A to physical address (e.g., page) X, but the processor jumps to an instruction that mapped (e.g., at binary translation time) virtual address (e.g., page) A to physical address (e.g., page) Y, the virtual to physical mapping may not be consider correct (e.g., fail). For example, hardware may see that the current address translation is A to Y, and that Y does not equal X, so there is an incorrect mapping. In one embodiment, the detection of the modification (e.g., mismatch) of the mapping may cause (e.g., an instruction to execute to cause) a corrective action to be taken, e.g., to correct the mapping. A corrective action may include, but is not limited to, stopping the execution of either or both of those instructions (e.g., any or all instructions on a page(s)), deleting the old translated (e.g., by binary translation) instruction that was based on the previous mapping, executing the original instruction without a (e.g., binary) translation, re-translating (e.g., with a DBT) the instruction(s) (e.g., with its current virtual to physical mapping). In one embodiment, the mapping mismatch may occur where virtual addresses are used by translation entry hardware and branch predictors. Detection of incorrect mapping may cause a fault to the binary translator (BT) run-time, and the run-time may now dispatch to the proper binary translation. In one embodiment, corrective action may include re-mapping the virtual address (e.g., page) to the different (e.g., relative to translation time) physical page mapping, e.g., without re-translating (e.g., by a binary translator) an instruction(s).

For a binary translation, a mapping that existed at the time of the binary translation (e.g., which may have changed since then) may be utilized (e.g., the virtual to physical mapping indicated by a field in the binary translated instruction) and that mapping may change before run-time (e.g., execution time). In one embodiment, a DBT system produces translations which make use of address-translation information collected at the time the DBT system is producing a translation. In one embodiment, a system (e.g., processor) may include checking the current (e.g., or immediately prior to execution) virtual to physical mapping for that instruction to detect a modification (e.g., mismatch) of the mapping. A modification of the mapping may cause a corrective action to be taken, for example, the prevention of the execution of the instruction (e.g., any or all instructions on a page). The detection of the modification may trigger (e.g., initiation of) a corrective action.

A binary translated instruction (e.g., code) may have its original (e.g., untranslated) instruction (e.g., code) modified after binary translation. As one example, a virtual address (e.g., page) may be referred to as "A" and it may map to a physical address (e.g., page) referred to as "X". If the original instruction (e.g., code) is modified after a binary translation, the binary translated instruction (e.g., code) may not be updated. A modification to the (e.g., data at a) virtual address and/or physical address (e.g., one or both being used in the binary translation) may cause the binary translated instruction to not be consider consistent (e.g., with the now-modified, untranslated code), e.g., modified). In one embodiment, the detection of a modification to the virtual and/or physical addresses (e.g., pages) or the data at those virtual and/or physical addresses (e.g., pages) may cause (e.g., an instruction to execute to cause) a corrective action to be taken, e.g., to correct the modification. For example, a modification (e.g., a write) to memory after a binary translation may cause a modification to the untranslated (e.g., by the binary translation) code if the code is stored at that memory. For example, a modification (e.g., a write) to memory after a binary translation may cause a modification to the virtual to physical mapping if the virtual to physical mapping is stored at that memory (e.g., as a page table). For example, hardware may see that a mode bit, e.g., indicating operation of a processor in 32 bit mode or 64 bit mode, in an address translation of instruction(s) (e.g., code) that has been binary translated is modified and cause a corrective action to be taken, e.g., to cause a binary translation of the instruction(s) based on the new mode. A corrective action may include, but is not limited to, stopping the execution of the instruction (e.g., any or all instructions at an address or on a page(s)), deleting the old translated (e.g., by binary translation) instruction, executing the original instruction without a (e.g., binary) translation, or re-translating (e.g., with a DBT) the instruction. In one embodiment, the mapping mismatch may occur where virtual addresses are used by translation entry hardware and branch predictors. Detection of incorrect mapping may cause a fault to the binary translator (BT) run-time, and the run-time may now dispatch to the proper binary translation.

In one embodiment, (e.g., logic) may perform a two part test for an instruction (e.g., code) to detect (i) a modification to the virtual to physical mapping for the instruction or (ii) a modification to data (e.g., data to be operated on) at a physical address (e.g., page) of the instruction. Detection of a modification of either (or both) may cause (e.g., an instruction to execute to cause) a corrective action to be taken, e.g., to correct the modification. A (e.g., hardware) consistency manager may detect a modification and/or cause a corrective action to be taken. In one embodiment, a (e.g., hardware) consistency manager may detect a self-modifying instruction (e.g., code) and/or a cross-modifying instruction (e.g., code), e.g., detected at a physical address (e.g., page). In one embodiment, a binary translation system may include a consistency manager and maintain translation consistency for the translated code. A (e.g., hardware) consistency manager may detect a modification(s) to existing translations that are not included in a translation lookaside buffer (e.g., an instruction translation lookaside buffer). In one embodiment, a (e.g., hardware) consistency manager may not include a physical map (PhysMap) of translation indications. Certain embodiments herein do not rely on any (e.g., uncore) components of a processor, for example, not utilizing a physical map (PhysMap) of translation indications and/or not utilizing a cache that is only for detecting a self-modifying instruction (e.g., code) and/or a cross-modifying instruction (e.g., code). Certain embodiments herein do not perform checks on the data TLB, for example, e.g., to avoid utilizing memory execution bandwidth. Certain embodiments herein do not use caching agents on the data side to ensure (e.g., binary) translation consistency (e.g., see the two part test above). Certain embodiments herein (e.g., using the iTLB) do not block fetch on page misses. Further, certain embodiments may provide (e.g., binary) translation consistency for a (e.g., binary) translated instruction (e.g., code) that does not reside in a TLB (e.g., iTLB), e.g., by using a cache in the page miss handler (PMH).

In one embodiment, a TLB (e.g., iTLB) may be (e.g., initially) accessed to determine whether the TLB contains a physical address corresponding to a linear address to identify a desired memory location mapping. If the linear address is found within the TLB, a hit may be said to have occurred and the physical address loaded out of the TLB. If the linear and/or physical addresses are not cached within the TLB, then a TLB miss may be said to have occurred. In the event of a miss, a page miss handler (PMH) may be used to perform a page (e.g., table) walk to determine the physical address corresponding to the desired linear address.

FIG. 1 illustrates a system 100 to prevent execution of a modified instruction according to embodiments of the disclosure. Depicted processor 102 includes an execution unit 104 and a consistency manager 106. Processor 102 may include one or more cores, e.g., which may have their own or a shared execution unit and/or consistency manager. An execution unit 104 may execute an instruction. The dotted lines are to indicate the optionality of the data communication paths that may exist between components. Other data communication paths (e.g., to components not depicted) may be included.

Code (e.g., binary code) 108 may be translated (e.g., by dynamic binary translator (DBT) 110) from a first (e.g., untranslated) format to a second (e.g., translated) format. DBT 110 may be in hardware, software, firmware, or a combination thereof. Code 108 (e.g., instruction(s)) may include a virtual to physical address (e.g., page) mapping. DBT 110 may translate the code from the first format to the second format for the instruction stream 112 based on the virtual to physical address (e.g., page) translation time mapping. The virtual to physical address (e.g., page) translation time mapping and/or the data at a physical address (e.g., for the code 108) may be modified. A modification may be detected by the consistency manager 106. Consistency manager may be in hardware, software, firmware, or a combination thereof. Consistency manager may cause a corrective action to be taken, e.g., preventing the modified instruction (e.g., code). Consistency manager 106 may detect a modification in untranslated (e.g., by the DBT) code 108. In one embodiment, consistency manager includes memory or access to memory to store a translation time virtual address (e.g., page) to physical mapping (e.g., an address translation at the time of the binary translation) for a binary translated instruction (e.g., code). In one embodiment, a binary translated instruction includes a field that indicates the at (e.g., binary) translation time virtual address (e.g., page) to physical address (e.g., page) mapping. Additionally or alternatively, a consistency manager may detect a modification to the data at a physical address (e.g., page). For example, a consistency manager may detect a modification (e.g., a store) to an instruction at the physical address (e.g., page) and/or to data stored at (e.g., written to) the physical address. In one embodiment, a binary translated instruction has a virtual to physical address (e.g., page) mapping (e.g., determined at binary translation time) and the consistency manager may detect a modification (e.g., between binary translation time and run time) to data at that physical address. For example, a consistency manager may include a connection (not shown) to monitor physical addresses (e.g., in cache or system memory). For example, a consistency manager may determine via a snoop hit (e.g., for a modified ("dirty") as opposed to non-modified (e.g., "clean") hit) that the physical address has been modified. In one embodiment, "execution time" virtual to physical address (e.g., page) mapping may be determined by rechecking code (e.g., code 108) to detect if the mapping has since changed (e.g., and if so, does the change prevent the code from executing correctly). In one embodiment, a store to a physical address of a page may not modify any physical address of a binary translated instruction(s) on that page, e.g., such that apparatuses and methods of this disclosure may not cause a corrective action to be initiated.

Consistency manager may initiate a corrective action, e.g., as discussed herein, on detection of a modification. In one embodiment, consistency manager may detect a modification corresponding to a binary translated instruction and then prevent execution of the binary translated instruction. Consistency manager may control the execution of instructions (e.g., by an execution unit 104) to prevent execution of the binary translated instruction. In one embodiment, binary translated instruction of instruction stream 112 may flow into the consistency manager 106 for it to test a binary translated instruction(s) for a modification(s) and block the modified binary translated instruction from being input into execution unit 104. In one embodiment, consistency manager 106 may detect a modification corresponding to a binary translated instruction, prevent execution of the binary translated instruction, and provide the modified, untranslated (e.g., not binary translated) instruction (e.g., from untranslated code 108) to execution unit 104. In one embodiment, consistency manager 106 may detect a modification corresponding to a binary translated instruction, prevent execution of the binary translated instruction, and (e.g., cause) the DBT 110 is to re-translate the modified, untranslated instruction (e.g., from untranslated code 108) to a modified, binary translated instruction (e.g., in instruction stream 112). For example, modified, binary translated instruction (e.g., in instruction stream 112) may flow into execution unit 104 for execution or into consistency manager 106 (e.g., for no additional modification check before being passed into execution unit 104 or an additional modification check). Scheduler (not shown) may assign an instruction to execution unit 104 and consistency manager 106 may include or control scheduler.

A single headed arrow herein may not be limited to one-way communication, for example, it may indicate two-way communication (e.g., both to and from that component). Any or all combinations of communications paths may be utilized in embodiments herein.

Figure 2:
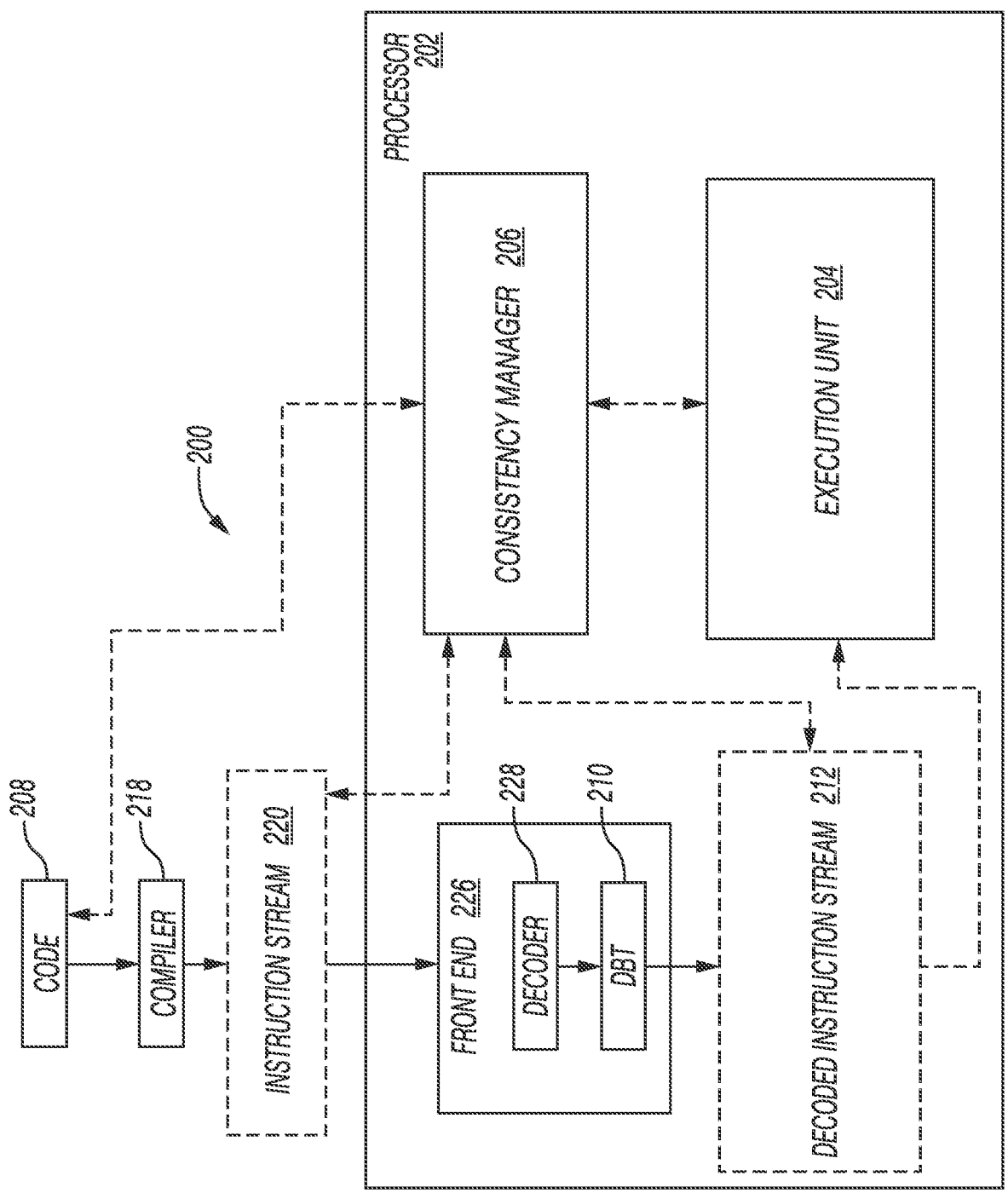
FIG. 2 illustrates a system to prevent execution of a modified instruction according to embodiments of the disclosure.

FIG. 2 illustrates a system 200 to prevent execution of a modified instruction according to embodiments of the disclosure. Depicted processor 202 includes a consistency manager 206 and an execution unit 204. Processor 202 may include one or more cores, e.g., which may have their own or a shared front end, DBT, execution unit, and/or consistency manager. An execution unit 204 may execute an instruction. The dotted lines are to indicate the optionality of the data communication paths that may exist between components. Other data communication paths (e.g., to components not depicted) may be included.

Code (e.g., binary code) 208 may be compiled (e.g., by a compiler 218), for example, code 208 may be source code (e.g., written in a programming or source language) and compiler may transform the source code into another computer language (e.g., the target machine language). Compiler may output a compiled instruction (e.g., as instruction stream 220). Compiler or other component may output a logical thread assignment (e.g., logical thread designation), for example, as a field in an (e.g., compiled) instruction or thread. A logical thread designation may indicate which particular logical thread that a translated instruction(s) is assigned. Assigning may refer to being a member of a thread of execution.

Each instruction in an instruction stream (e.g., instruction stream 220 or decoded instruction stream 212) may include a respective logical thread address (e.g., page) mapped to physical thread address (e.g., page). Instruction stream 220 may include a compile time virtual to physical address (e.g., page) mapping. Decoded instruction stream 212 may include a decode time virtual to physical address (e.g., page) mapping. Consistency manager may function as in one or more embodiments discussed in reference to FIG. 1.

Consistency manager 206 may detect a modification in source (e.g., uncompiled and untranslated (e.g., by the DBT)) code (e.g., code 208) corresponding to a (e.g., currently or scheduled to be executed) binary translated instruction. Additionally or alternatively, consistency manager 206 may detect a modification in compiled and untranslated (e.g., by the DBT) code (e.g., instruction stream 220) corresponding to a binary translated instruction. Consistency manager 206 may detect a modification by comparing the information (e.g., virtual to physical mapping or data at a physical page) of a binary translated instruction (e.g., of decoded instruction stream 212) to the corresponding untranslated source instruction at source code 208, at stream 220, and/or exiting the decoder 228 (e.g., before dynamic binary translation at DBT 210).

As depicted, an instruction (e.g., of instruction stream 220) may be output to the processor 202, e.g., a front end 226 of the processor 202. Front end 226 may fetch and prepare instructions to be used by other components of processor 202. Processor may include a dynamic binary translator (DBT) as a separate component (not shown) or as a component of front end 226, e.g., as depicted in FIG. 2. Front end 226 may include a decoder 228 (e.g., an instruction decoder to decode an instruction into the control signals (e.g., micro-instructions) to control the execution of the instruction). Decoder may output decoded code (e.g., a decoded instruction) to a binary translator (e.g., DBT 210 of processor 202). Binary translator (e.g., DBT 210) may translate an instruction (e.g., from instruction stream 220)

from a first (e.g., untranslated) format to a second (e.g., translated) format. In one embodiment, an instruction stream (e.g., translated, decoded instruction stream 212) may be output from DBT 210 and may include a virtual address (e.g., virtual page) to physical address (e.g., physical page) mapping (e.g., a translation time mapping).

Consistency manager 206 may detect a modification in untranslated (e.g., not translated by the DBT) code. In one embodiment, consistency manager includes memory or access to memory to store a translation time virtual address (e.g., page) to physical mapping for a binary translated instruction (e.g., code). In one embodiment, a binary translated instruction includes a field that indicates the translation time virtual address (e.g., page) to physical address (e.g., page) mapping. Additionally or alternatively, a consistency manager may detect a modification to the data at a physical address (e.g., page). For example, a consistency manager may detect a modification (e.g., a store) to an instruction at the physical address (e.g., page) and/or to data saved at the physical address. In one embodiment, a binary translated instruction has a virtual to physical address (e.g., page) mapping (e.g., determined at binary translation time) and the consistency manager may detect a modification (e.g., between binary translation time and run time) to data at that physical address. For example, a consistency manager may include a connection (not shown) to monitor physical addresses (e.g., in cache or system memory). For example, a consistency manager may determine via a snoop hit (e.g., modified ("dirty") as opposed to non-modified (e.g., "clean")) that the physical address has been modified. In one embodiment, "execution time" virtual to physical address (e.g., page) mapping may be determined by rechecking code (e.g., source code 208, compiled code at instruction stream 220, and/or decoded code output from decoder 228) to detect if the mapping has since changed (e.g., and if so, does the change prevent the code from executing correctly).

Consistency manager may initiate a corrective action, e.g., as discussed herein, on detection of a modification. In one embodiment, consistency manager may detect a modification corresponding to a binary translated instruction and then prevent execution of the binary translated instruction. Consistency manager may control the execution of instructions (e.g., by an execution unit 204) to prevent execution of the binary translated instruction. In one embodiment, binary translated instruction of instruction stream 212 may flow into the consistency manager 206 for it to test a binary translated instruction(s) for a modification(s) and block the modified binary translated instruction from being input into execution unit 204. In one embodiment, consistency manager 206 may detect a modification corresponding to a binary translated instruction, prevent execution of the binary translated instruction, and provide the modified, untranslated instruction (e.g., from untranslated, source code 208 or from untranslated, compiled code at 220) to execution unit 204. In one embodiment, consistency manager 206 may detect a modification corresponding to a binary translated instruction, prevent execution of the binary translated instruction, and (e.g., cause) the DBT 210 is to re-translate the modified, untranslated instruction (e.g., from untranslated code) to a modified, binary translated instruction (e.g., in instruction stream 212). For example, modified, binary translated instruction (e.g., in instruction stream 212) may flow into execution unit 204 for execution or into consistency manager 206 (e.g., for no additional modification check before being passed into execution unit 204 or an additional modification check). Scheduler (not shown) may assign an instruction to execution unit 204 and consistency manager 206 may include or control scheduler.

In one embodiment, a DBT may include instructions that execute, e.g., to perform the detection and/or cause the corrective action to begin or complete.

Figure 3:
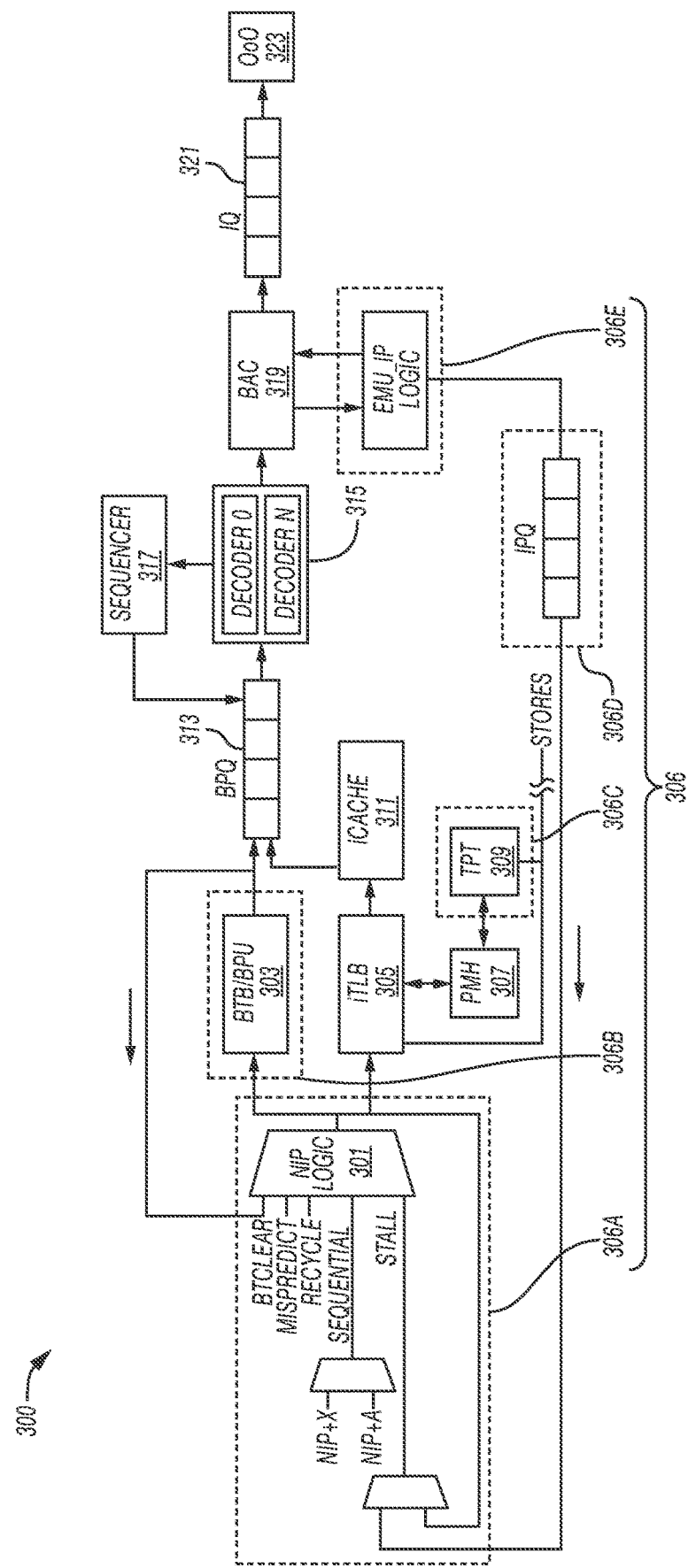
FIG. 3 illustrates a circuit to prevent execution of a modified instruction according to embodiments of the disclosure.

FIG. 3 illustrates a circuit 300 to prevent execution of a modified instruction according to embodiments of the disclosure. In certain instances, the terms page and address may be used interchangeably. System may include a consistency manager 306. Consistency manager may include any one or any combination of the components shown in FIG. 3. Depicted consistency manager 306 includes next instruction logic 306A, branch target buffer (BTB)/branch prediction unit (BPU) 306B, translation protection table 306C, queue of instruction pointer data (IPQ) 306D, and emulated instruction pointer (EMU_IP) logic. An instruction pointer may be any size (e.g., 16 bit, 32 bit, 64 bit, etc.).

In order to track which physical (e.g., x86) page the current translation (e.g., translated instruction) is coming from, a (e.g., dynamic) binary translator may (e.g., via inserting one or more (e.g., a specific sequence of) instructions to be executed to) determine the (e.g., current) physical page for the translation (e.g., translated instruction) and the physical page for the translation (e.g., translated instruction) assumed by the binary translator (e.g., at translation time). This may be done by two instructions, e.g., discussed herein as a make an instruction pointer (MKIP) and translate (X), compare, and trap (XCATNE). This may be done by a single instruction. MKIP instruction may set an emulated instruction pointer (EMU_IP) to a specific value. XCATNE instruction may check for a modification or any modifications, e.g., as discussed herein. XCATNE may translate an emulated instruction pointer (EMU_IP) using an iTLB and perform a compare and trap checks to determine if the current virtual to physical page mapping matches what was assumed and/or expected by the translation (e.g., translated instruction). MKIP instruction may update the value of the current (e.g., x86) page. XCATNE instruction may encode the (e.g., x86) physical page assumed at the point the (e.g., binary) translation was created (e.g., at translation time).

Figure 4:
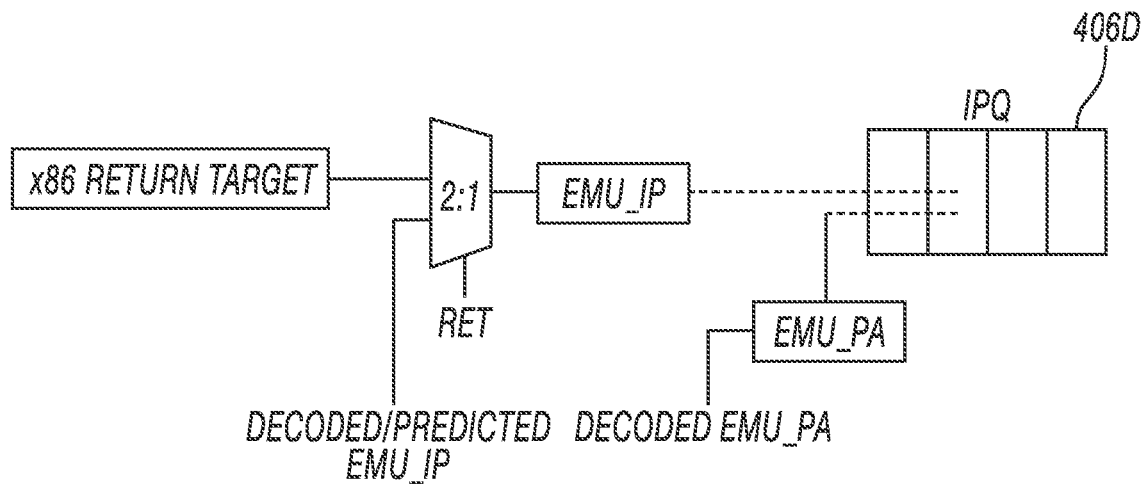
FIG. 4 illustrates an emulated instruction pointer circuit according to embodiments of the disclosure.

Circuit 300 or portions of circuit of FIG. 3 may be part of a processor. In one embodiment, circuit 300 is part of a front end (e.g., front end 226 in FIG. 2) of a processor. Next instruction pointer (NIP) logic 301 may determine the next (e.g., after the current IP, where the current IP may refer to the next instruction to be executed) instruction pointer. NIP logic 301 may output a NIP value to branch target buffer (BTB)/branch prediction unit (BPU) 303 and/or instruction TLB (iTLB) 305. BTB/BPU 303 may output an instruction's physical address therefrom to the branch prediction queue 313. The iTLB 305 may determine if the instruction pointed to by the NIP (e.g., output from NIP logic 301) corresponds to any instruction in the TLB (e.g., indicating the virtual address (e.g., page) to physical address (e.g., page) mapping for the instruction pointed to by the NIP). If the instruction pointed to by the NIP is not present in the iTLB, it may query the page miss handler (PMH) 307 to walk through the page table of the code to find the correct virtual address (e.g., page) to physical address (e.g., page) mapping for the instruction pointed to by the NIP. The translation protection table 309 (e.g., data structure) may be used, for example, to store data indicating a (e.g., binary) translated instruction has not been modified, e.g., that the physical page has not been modified since the binary translation. PMH 307 may check the TPT 309 each time the iTLB accesses the PMH 307. Additionally or alternatively, the consistency manager may cause an update to the TPT (e.g., indicating that a physical page has been modified and should not be executed) which may cause the iTLB to update its entry for that instruction. The iTLB 305 and/or BTB/BPU 303 may output a physical address from the iTLB into the branch prediction queue (BPQ) 313. Decoder 315 may decode the instruction located at the physical address (which may be placed back into the BPQ 313 according to the sequencer 317). Decoded instruction may be output from decoder 315 to branch address calculator (BAC) 319. BAC 319 may include EMU_IP logic 306E. One embodiment of EMU_IP logic is depicted in FIG. 4. BAC 319 may receive decode information from the decoder (decode unit) 315 about the decoded instruction. For example, the branch address calculator may identify and predict the outcome of branch instructions such that the NIP logic 301 may retrieve the program instructions required by an execution unit (not shown) in advance. In the event that the outcome of a branch instruction was predicted incorrectly, the NIP logic 301 may determine the address of the next instruction in the correct path for code execution. The BAC 319 may output the decoded instruction to an execution unit. In the depicted embodiment in FIG. 3, BAC 319 may output the instruction to an instruction queue (IQ) 321 which may then output the decoded instruction to an Out-of-Order (OoO) execution engine 323.

Consistency manager may maintain a register with emulated (e.g., x86) instruction pointer values (e.g., EMU_IP) and/or a register with emulated (e.g., x86) physical address (e.g., EMU_PA). These registers may be in the branch address calculator (BAC) 319 (e.g., where the BAC calculation is performed after a decode action) and there may be copies of them at retirement, e.g., to recover from misprediction(s) and/or potential translation rollbacks. When MKIP and XCATNE instructions pass through the BAC, they may speculatively update any BAC copies. When MKIP and XCATNE instructions retire, they may update the retirement copies. In case of a misprediction, exception, or any other disruption, the retirement copies may be copied to the BAC. When a commit instruction retires (e.g., indicating that the translated region completed successfully), the retirement copies may be saved in a third copy of the registers. In case of a translation rollback (e.g., because of static scheduling errors), the commit copies of the registers may be copied, e.g., to both the retirement copies and the BAC copies. One embodiment of EMU_IP logic is depicted in FIG. 4.

FIG. 4 illustrates an emulated instruction pointer circuit 400 according to embodiments of the disclosure. In reference to the branch address calculator (BAC) EMU_IP logic in FIG. 4, the value of the EMU_IP may be updated, for example, either using a MKIP instruction or return stack buffer (RSB) hardware, e.g., to accelerate emulation of calls and returns. RSB may refer to a buffer implemented within a processor (e.g., core) that contains a (e.g., last-in-first-out (LIFO)) stack of return addresses. Each time a call subroutine instruction is encountered, a return address may be pushed onto the RSB. When a later return from a subroutine instruction is encountered, the return address on the top of the return stack buffer may be popped off and given to the instruction fetch unit. In one embodiment herein, the consistency manager and/or binary translator will push to this RSB not only the return address but also the return EMU_IP (e.g., for when the call crosses a page). When an update to the EMU_IP occurs, the logic may update the BAC copy of it and write the value to the tail of the IPQ 406D. The IPQ may be a circular buffer that is written at the BAC, and read at the NIP logic, see, e.g., FIG. 1. The binary translator may emit a XCATNE instruction in order to indicate the assumed physical address. When the XCATNE reaches the BAC, it may also be written to the register and to the IPQ. The tail pointer of the IPQ may then be updated to point to the next empty entry. The head of the IPQ may be read on every cycle and passed to the NIP logic (e.g., 301 in FIG. 3), e.g., as the lowest priority redirection signal. As such, it may only have an effect if the BPU logic is stalled. When a stall happens, the consistency manager may checkpoint the current NIP and perform the access to the iTLB using the EMU_IP stored at the head of the IPQ. The path to the BPU may be clock gated, so that the EMU_IP may not result in a prediction from the BPU. The physical address may then be compared against the EMU_PA stored in the IPQ head entry, and restore the NIP to the value it had before the EMU_IP was passed and remove the BPU block gating condition. In an embodiment when the EMU_PA stored at the head of the IPQ matches the output of the iTLB, then the corresponding IPQ entry may be marked as done. If not, it may mark the IPQ entry as done and faulting. A high level view of the NIP logic is shown in FIG. 5.

Figure 5:
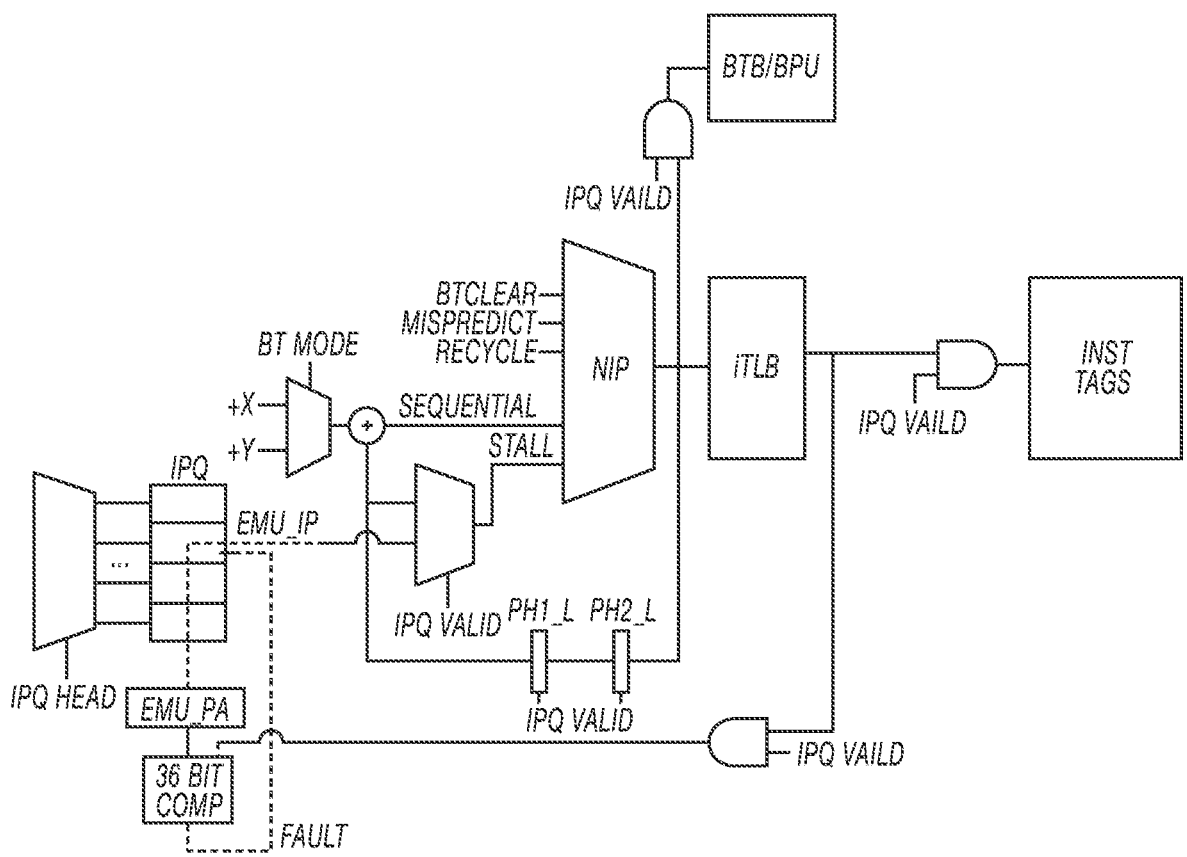
FIG. 5 illustrates an instruction pointer circuit according to embodiments of the disclosure.
Figure 6A:
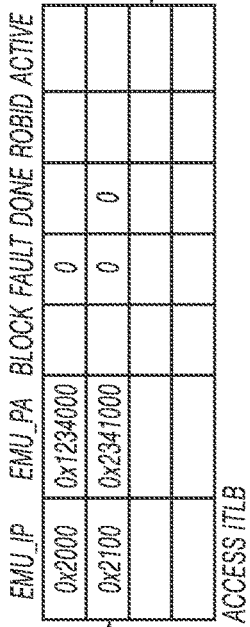
FIG. 6A-6G illustrate the utilization of a data structure to prevent execution of a modified instruction according to embodiments of the disclosure.
Figure 6B:
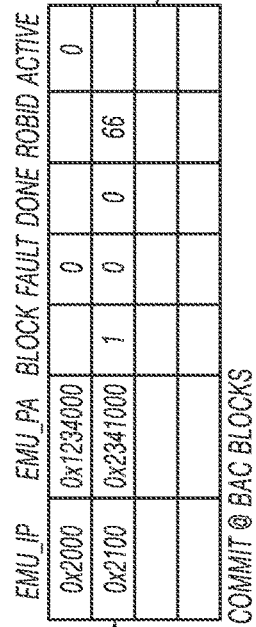
Figure 6E:
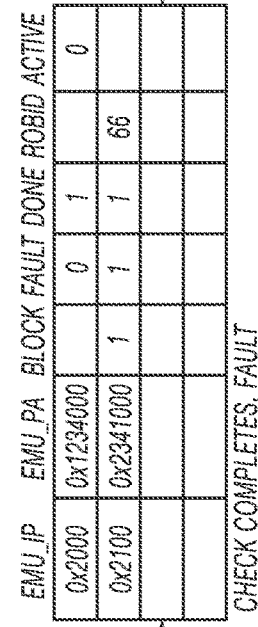
Figure 6C:
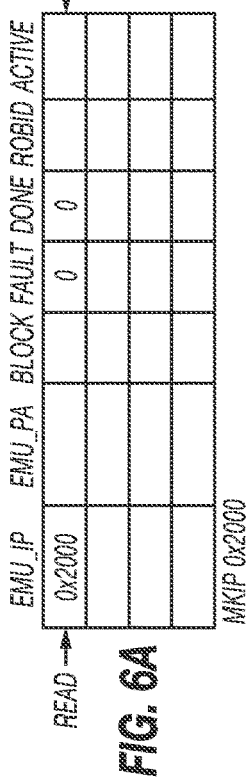
Figure 6D:
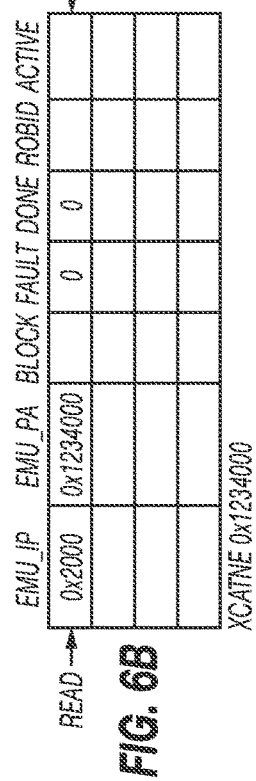
Figure 6F:
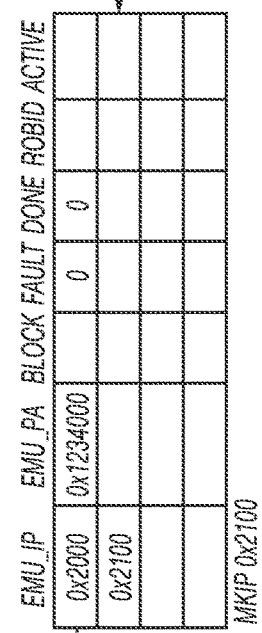
Figure 6G:
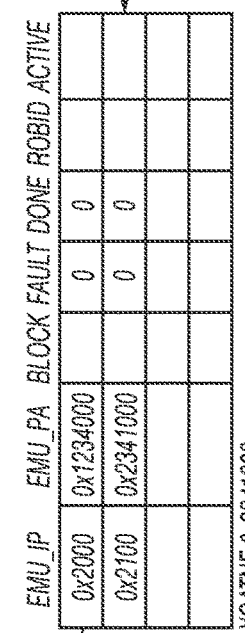

FIG. 5 illustrates an instruction pointer circuit 500 according to embodiments of the disclosure. The NIP logic (illustrated as a mux) may include inputs of branch taken clear signal (BTClear), mispredict (e.g., misprediction signals from BAC and/or OoO), and recycle (e.g., recycled IP for when front-end retries a given IP, for example, but not limited to, for stalls, misses, etc.).

In an embodiment when there is a miss in the iTLB, a request may be sent to the PMH. The original NIP may be restored and the current IPQ entry marked as pending in the iTLB. In one embodiment when the IPQ head is in this state, no further accesses are to be performed by the IPQ, e.g., even if the BPU is stalled. As part of the PMH walk, a cache called the translation protection table (e.g., TPT 309 in FIG. 3) may also be accessed with the EMU_IP. A hit in this table may indicate that a translation for this (e.g., x86) page has a valid translation, while a miss may indicate that there is no translation that the hardware is aware of. Each time a translation is generated, the consistency manager and/or binary translator may include an entry in this cache, e.g., via executing an (e.g., "TPTINS") instruction. When the page comes back to the iTLB, the iTLB pending bit may be unset, e.g., so that in the next occasion where the BPU will be stalled an access to the iTLB will be performed. Pages for which there is a hit in the TPT may be marked (e.g., setting a "T" bit to high). An access to the iTLB from the IPQ to a page with the T bit unset (e.g., set to low in binary) may set the faulting bit to true.

In one embodiment, when a commit instruction passes through the BAC, the system may check whether any prior MKIP and/or XCATNE checks have failed or not. If they have failed, then the commit instruction may raise a fault when it retires, e.g., to trigger a rollback. If they have not failed, then the commit instruction may retire without raising any fault (e.g., at least not a translation consistency fault). In one embodiment, all prior checks are finished by the time the commit reaches the BAC. In an embodiment where all prior checks are not finished by the time the commit reaches the BAC then the commit may have a blocking behavior (e.g., it is not allowed to retire until all the checks are complete). In one embodiment, the consistency manager may set a reorder buffer (ROB) complete bit such that non-blocking commits set it directly while blocking commits are to wait for the bit to be set by the IPQ. When a blocking commit reaches BAC, it may keep a copy of the pointer of the tail of the IPQ. When the commit gets allocated a ROB entry, a second check to the IPQ may be performed by the commit instruction using this pointer. If at that time the checks are done, then the commit may be converted to a non-blocking one. If not, the reorder buffer identification (ROBid) may be stored in the IPQ, the blocking bit set in the IPQ entry, and the ROB complete bit not set for the commit instruction. When the IPQ has finished with all checks prior to a commit (e.g., an entry in the IPQ with the block bit set), a signal may be sent to the ROB with the ROBid and whether a fault needs to be raised or not. An example of how this process works is shown in FIGS. 6A-6G. In this embodiment, the first MKIP may set the virtual address (e.g., as in FIG. 6A) for a first binary translated instruction and then the XCATNE may set the assumed (e.g., at binary translation time) physical address (e.g., as in FIG. 6B). In this embodiment, the second MKIP may set the virtual address (e.g., as in FIG. 6C) for a second binary translated instruction and then the XCATNE may set the assumed (e.g., at binary translation time) physical address (e.g., as in FIG. 6D). When the XCATNE instruction writes to the IPQ, the write pointer may be moved down (e.g., as in FIG. 6E). As accesses happen to the iTLB, the done bit may be set and the read pointer may be moved (e.g., as in FIG. 6E). If there is a previous (commit) instruction and there is a check that has the done bit is unset, the last valid entry may be marked as blocking (e.g., as in FIG. 6F) and the commit may have to wait for the checks to finish before it is able to retire. The commit instruction may keep a pointer to the entry that it read and once it has been allocated (e.g., and its ROBid is known), the hardware may check that entry again. If the check is done, then the hardware may set the ROB complete bit or write its ROBid to that entry (e.g., as in FIG. 6G). If when the check finishes a fault is detected, then the corresponding commit may raise a fault when it reaches the head of the ROB. The IPQ may not be maintained, so that in case there is a disruption (e.g., a JEClear that flushes the front end) the IPQ data may be lost. The data may not require saving, for example, where any check that still to be performed is a check done in the wrong path and checks that are still in flight and cannot be aborted are marked as active and before they complete, the corresponding entry may not be re-used.

Figure 7:
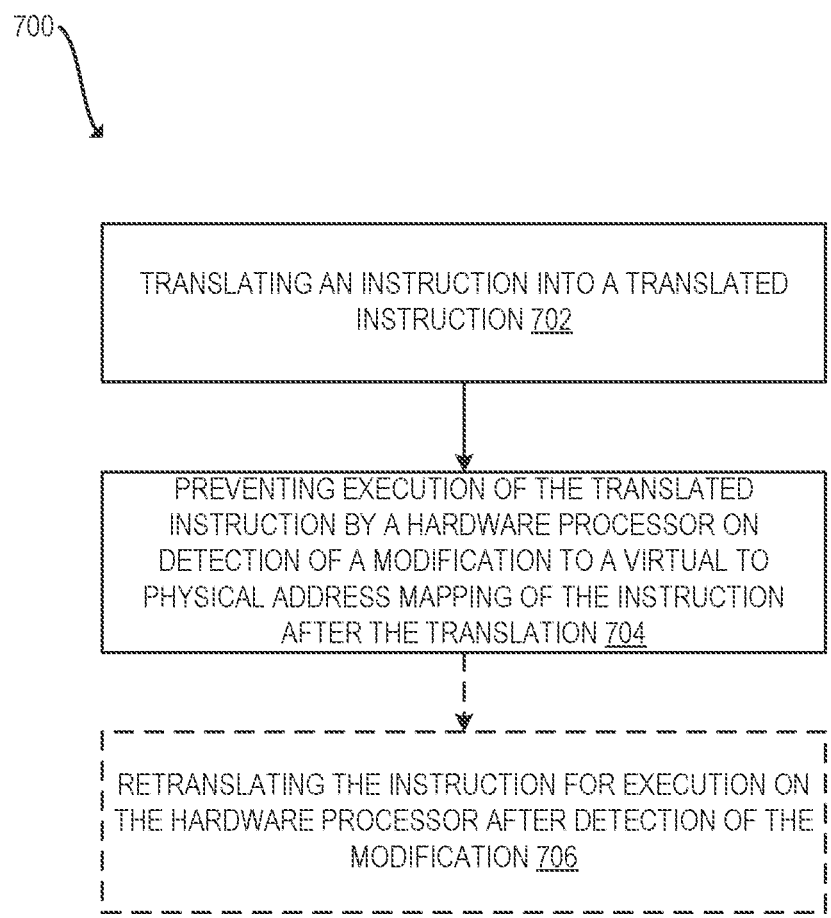
FIG. 7 illustrates a flow diagram of preventing execution of a modified instruction according to embodiments of the disclosure.

FIG. 7 illustrates a flow diagram of preventing execution of a modified instruction according to embodiments of the disclosure. Depicted flow diagram 700 includes translating an instruction into a translated instruction 702, and preventing execution of the translated instruction by a hardware processor on detection of a modification to a virtual to physical address mapping of the instruction after the translation 704. Optionally, flow diagram may include retranslating the instruction for execution on the hardware processor after detection of the modification 706. A hardware processor may utilize the flow diagram of FIG. 7.

To maintain translation consistency, there may be (e.g., x86 level) SMC or XMC, e.g., which may alter the original code for which the binary translator has already generated a translation. A binary translator may include (e.g., add) into the binary translated code information that will indicate which physical pages (e.g., at translation time) that the binary translated code is mapped. The identification of these physical pages may be inserted in the TLB (e.g., iTLB) and a hardware cache (e.g., the TPT). Both of these structures may be snooped against all stores thereto. In case of a snoop hit on the iTLB, an SMC or XMC event may be detected on the untranslated (e.g., original) code. The hardware may then perform a corrective action, e.g., vector to a fault handling routine in the binary translator. Snoop hits on the hardware data cache (e.g., TPT), may only trigger a fault when the physical page that previously received the snoop hit is inserted into the iTLB (and thus re-used). If such a fault is detected, the binary translator may invalidate the translation(s) derived from the specific page, and optionally may resumes execution of non binary translated (e.g., x86) code.

In one embodiment, an apparatus includes a hardware binary translator to translate an instruction to a translated instruction, and a consistency hardware manager to prevent execution of the translated instruction by a hardware processor on detection of a modification to a virtual to physical address mapping of the instruction after the translation. The hardware processor may execute the instruction after detection of the modification, wherein the instruction is untranslated. The hardware binary translator may retranslate the instruction for execution on the hardware processor after detection of the modification. The consistency hardware manager may also prevent execution of the translated instruction by the hardware processor on detection of a modification to data at a physical address of the instruction after the translation. The consistency hardware manager may compare a translation time virtual to physical address mapping to an execution time virtual to physical address mapping of the instruction to detect the modification. The consistency hardware manager may check an instruction buffer of the hardware processor to detect the modification to the virtual to physical address mapping.

In another embodiment, an apparatus includes a data storage device that stores code that when executed by a hardware processor causes the hardware processor to perform the following: translating an instruction into a translated instruction, and a consistency hardware manager to prevent execution of the translated instruction by the hardware processor on detection of a modification to a virtual to physical address mapping of the instruction after the translation. The data storage device may further store code that when executed by the hardware processor causes the hardware processor to perform the following: executing the instruction after detection of the modification, wherein the instruction is untranslated. The data storage device may further store code that when executed by the hardware processor causes the hardware processor to perform the following: retranslating the instruction for execution on the hardware processor after detection of the modification. The data storage device may further store code that when executed by the hardware processor causes the hardware processor to perform the following: preventing execution of the translated instruction by the hardware processor on detection of a modification to data at a physical address of the instruction after the translation. The data storage device may further store code that when executed by the hardware processor causes the hardware processor to perform the following: comparing a translation time virtual to physical address mapping to an execution time virtual to physical address mapping of the instruction to detect the modification. The data storage device may further store code that when executed by the hardware processor causes the hardware processor to perform the following: checking an instruction buffer of the hardware processor to detect the modification to the virtual to physical address mapping.

In yet another embodiment, a method includes translating an instruction into a translated instruction, and preventing execution of the translated instruction by a hardware processor on detection of a modification to a virtual to physical address mapping of the instruction after the translation. The method may include executing the instruction after detection of the modification, wherein the instruction is untranslated.

The method may include retranslating the instruction for execution on the hardware processor after detection of the modification. The method may include preventing execution of the translated instruction by the hardware processor on detection of a modification to data at a physical address of the instruction after the translation. The method may include comparing a translation time virtual to physical address mapping to an execution time virtual to physical address mapping of the instruction to detect the modification. The method may include checking an instruction buffer of the hardware processor to detect the modification to the virtual to physical address mapping.

In another embodiment, an apparatus includes a hardware processor, and a data storage device that stores code that when executed by the hardware processor causes the hardware processor to perform the following: translating an instruction into a translated instruction, and preventing execution of the translated instruction by the hardware processor on detection of a modification to a virtual to physical address mapping of the instruction after the translation. The data storage device may further store code that when executed by the hardware processor causes the hardware processor to perform the following: executing the instruction after detection of the modification, wherein the instruction is untranslated. The data storage device may further store code that when executed by the hardware processor causes the hardware processor to perform the following: retranslating the instruction for execution on the hardware processor after detection of the modification. The data storage device may further store code that when executed by the hardware processor causes the hardware processor to perform the following: preventing execution of the translated instruction by the hardware processor on detection of a modification to data at a physical address of the instruction after the translation. The data storage device may further store code that when executed by the hardware processor causes the hardware processor to perform the following: comparing a translation time virtual to physical address mapping to an execution time virtual to physical address mapping of the instruction to detect the modification. The data storage device may further store code that when executed by the hardware processor causes the hardware processor to perform the following: checking an instruction buffer of the hardware processor to detect the modification to the virtual to physical address mapping.

In yet another embodiment, an apparatus includes means for translating an instruction into a translated instruction, and means for preventing execution of the translated instruction by a hardware processor on detection of a modification to a virtual to physical address mapping of the instruction after the translation. An apparatus to prevent execution of a modified instruction may be as described in the detailed description. A method to prevent execution of a modified instruction may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 8A is a block diagram illustrating both an exemplary in-order pipeline and an exemplary register renaming, out-of-order issue/execution pipeline according to embodiments of the disclosure. FIG. 8B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general purpose registers. The physical register file(s) unit 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 9B:
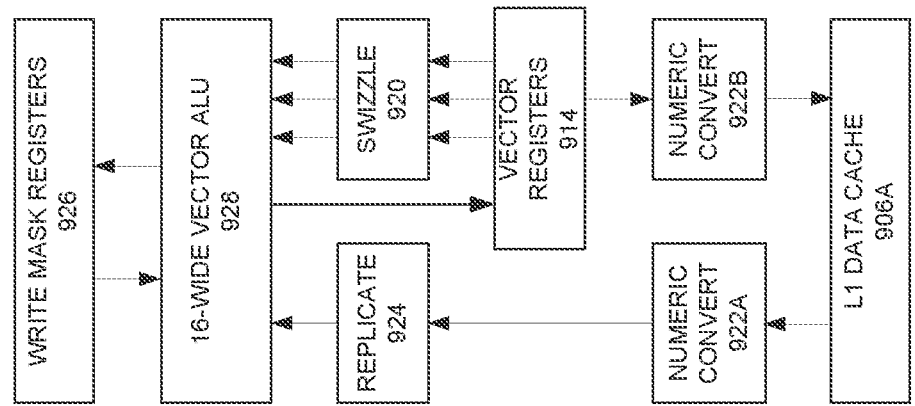
FIG. 9B is an expanded view of part of the processor core in FIG. 9A according to embodiments of the disclosure.
Figure 9A:
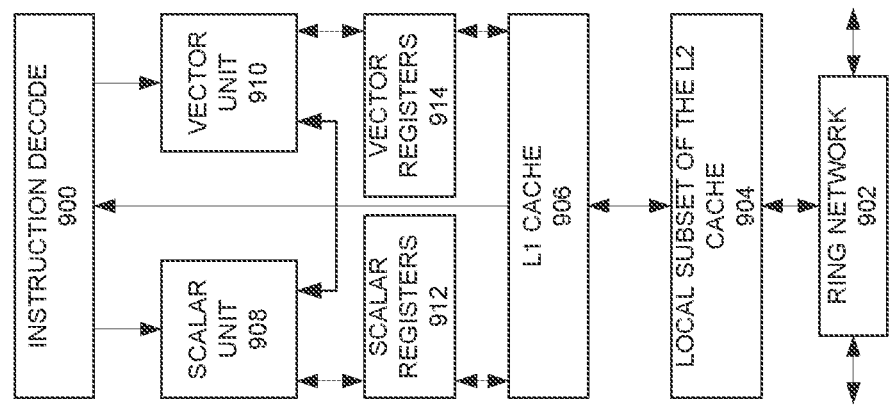
FIG. 9A is a block diagram of a single processor core, along with its connection to the on-die interconnect network and with its local subset of the Level 2 (L2) cache, according to embodiments of the disclosure.

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to embodiments of the disclosure. In one embodiment, an instruction decode unit 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 912 and vector registers 914) and data transferred between them is written to memory and then read back in from a level 1 (L1) cache 906, alternative embodiments of the disclosure may use a different approach (e.g., use a single register set or include a communication path that allow data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the disclosure. FIG. 9B includes an L1 data cache 906A part of the L1 cache 904, as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

Figure 10:
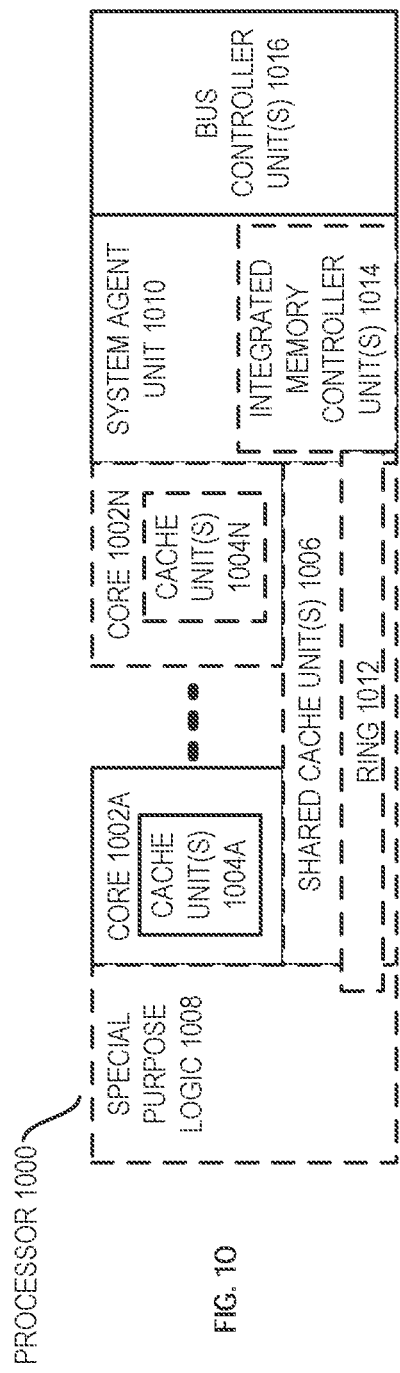
FIG. 10 is a block diagram of a processor that may have more than one core, may have an integrated memory controller, and may have integrated graphics according to embodiments of the disclosure.

FIG. 10 is a block diagram of a processor 1000 that may have more than one core, may have an integrated memory controller, and may have integrated graphics according to embodiments of the disclosure. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002-A-N.

In some embodiments, one or more of the cores 1002A-N are capable of multithreading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Exemplary Computer Architectures

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
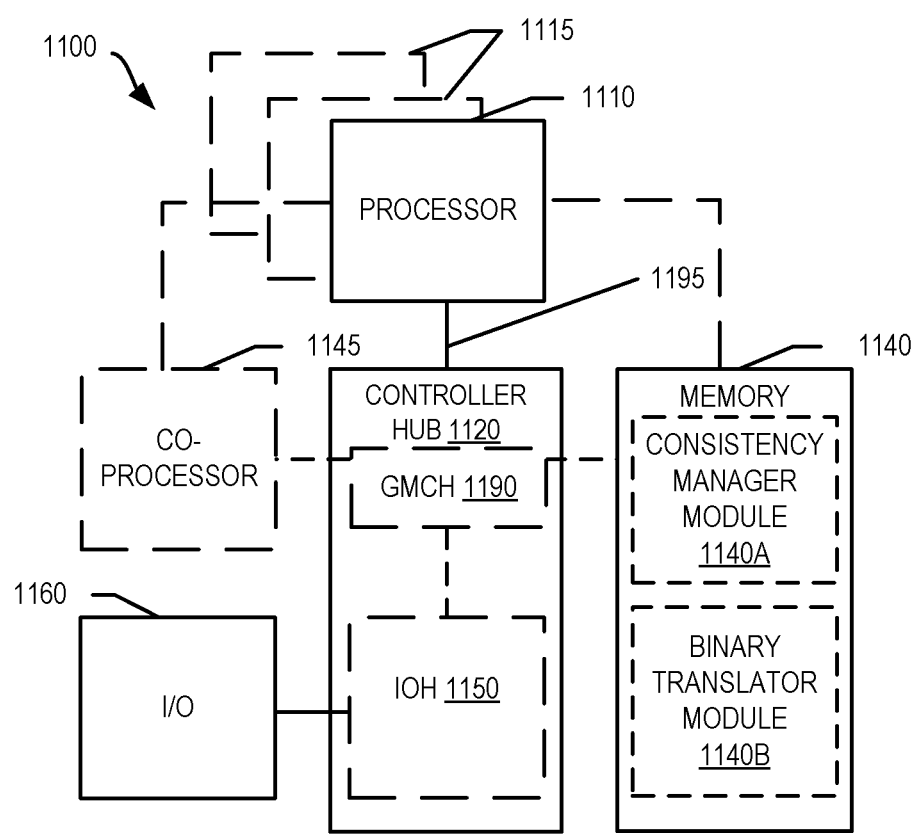
FIG. 11 is a block diagram of a system in accordance with one embodiment of the present disclosure.

Referring now to FIG. 11, shown is a block diagram of a system 1100 in accordance with one embodiment of the present disclosure. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150. Memory 1140 may include a consistency manager module 1140A, for example, to store code that when executed causes a processor to perform any (e.g., consistency management) method of this disclosure. Memory 1140 may include a binary translator module 1140B, for example, to store code that when executed causes a processor to perform any (e.g., binary translation) method of this disclosure.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
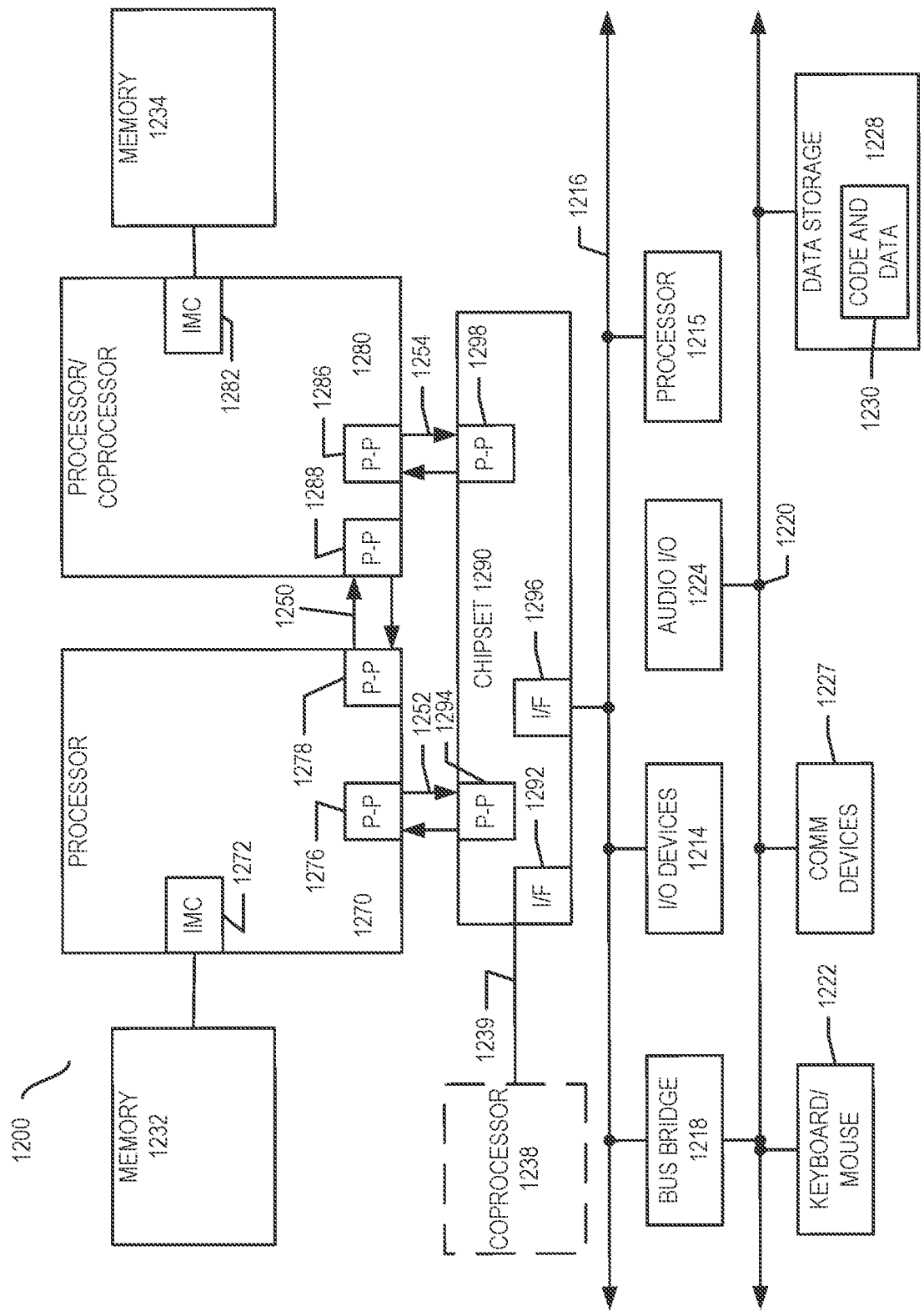
FIG. 12 is a block diagram of a more specific exemplary system in accordance with an embodiment of the present disclosure.

Referring now to FIG. 12, shown is a block diagram of a first more specific exemplary system 1200 in accordance with an embodiment of the present disclosure. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the disclosure, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present disclosure is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
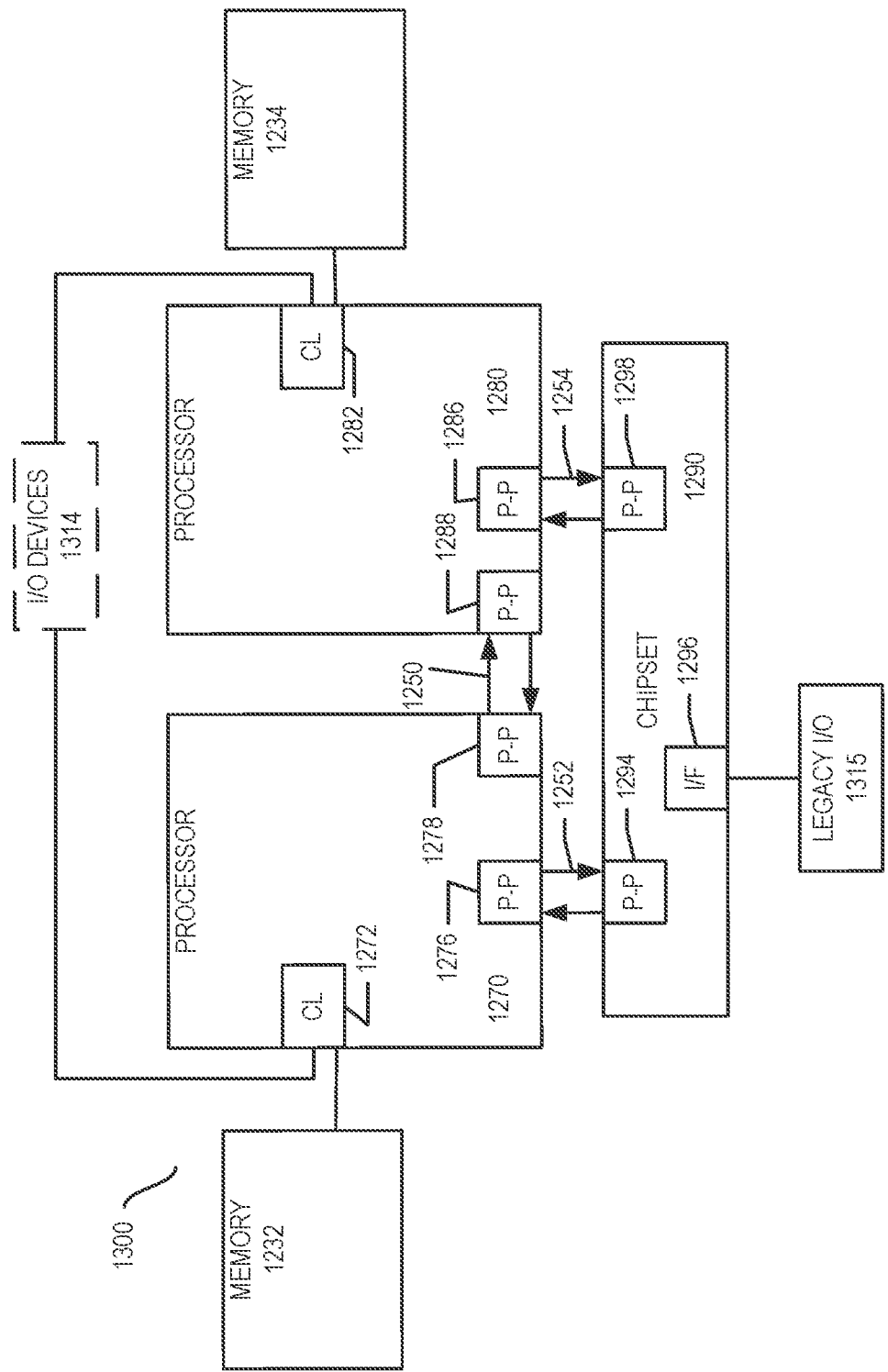
FIG. 13, shown is a block diagram of a second more specific exemplary system in accordance with an embodiment of the present disclosure.

Referring now to FIG. 13, shown is a block diagram of a second more specific exemplary system 1300 in accordance with an embodiment of the present disclosure. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL")

1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
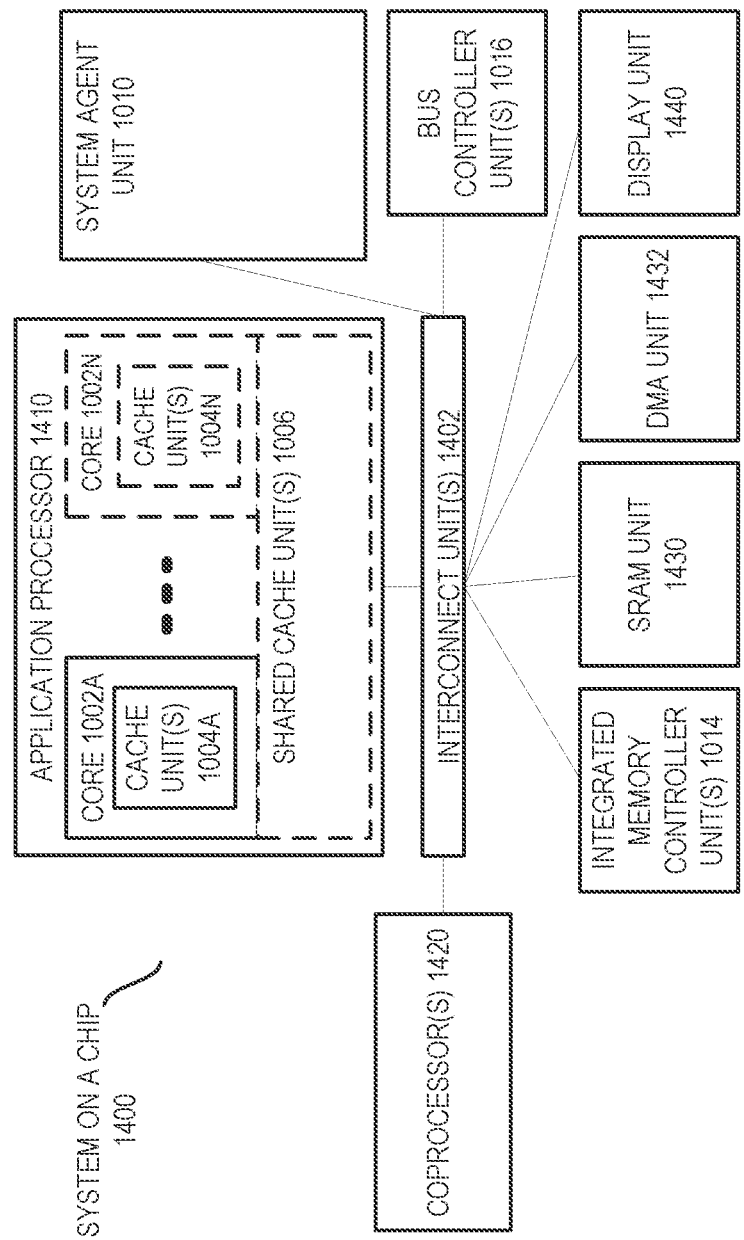
FIG. 14, shown is a block diagram of a system on a chip (SoC) in accordance with an embodiment of the present disclosure.

Referring now to FIG. 14, shown is a block diagram of a SoC 1400 in accordance with an embodiment of the present disclosure. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 202A-N and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 15:
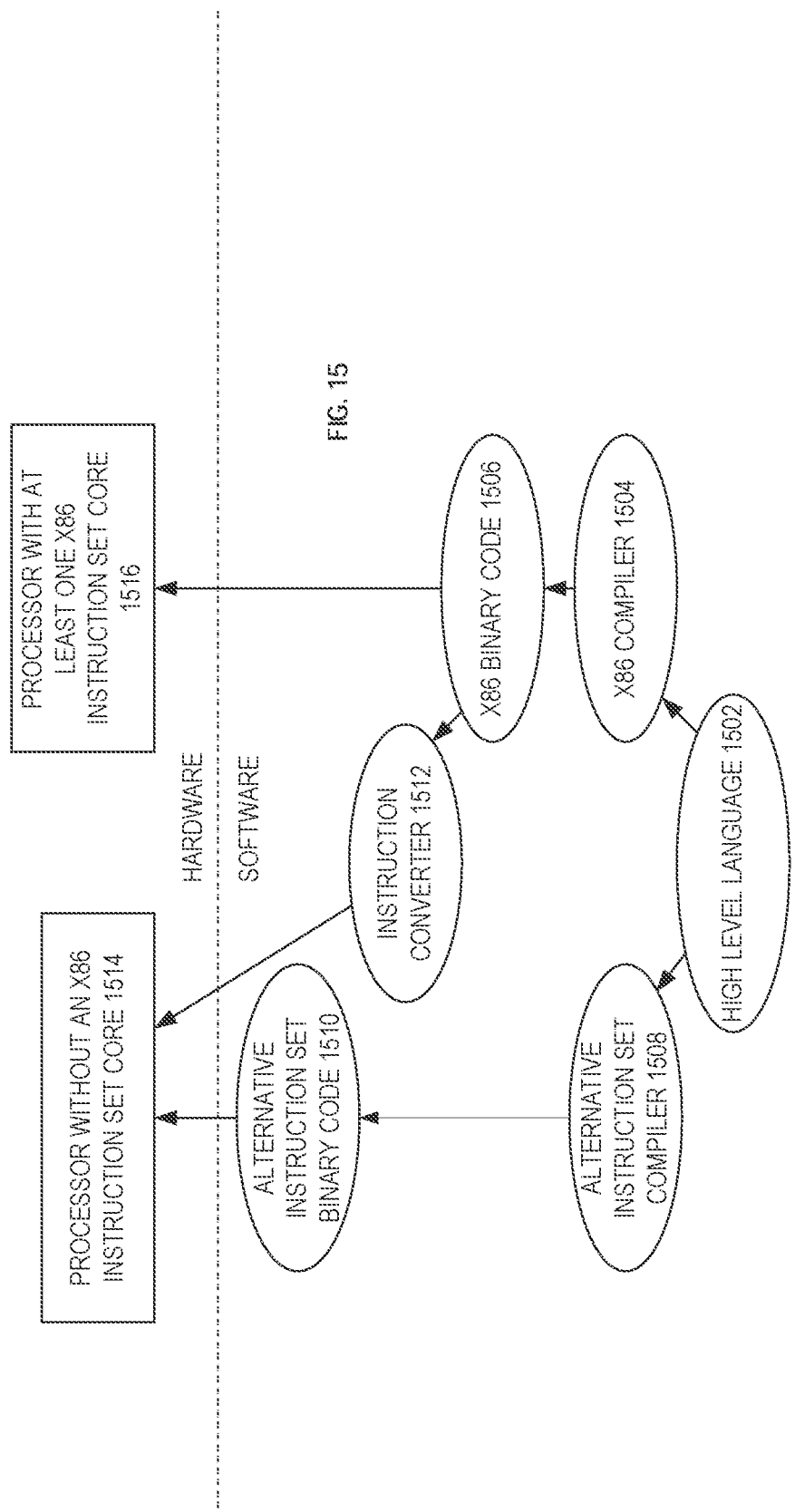
FIG. 15 is a block diagram contrasting the use of a software instruction converter to convert binary instructions in a source instruction set to binary instructions in a target instruction set according to embodiments of the disclosure.

FIG. 15 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

What is claimed is:

1. An apparatus comprising:
    a hardware binary translator to translate an instruction into a translated instruction in an instruction stream, and insert a second instruction into the instruction stream that, when decoded and executed, stores a virtual to physical address mapping of the instruction existing at translation time in storage; and
    a consistency hardware manager to check for a modification to a virtual to physical address mapping of the instruction after the translation by a comparison of the virtual to physical address mapping existing at translation time from the storage to a virtual to physical address mapping of the instruction existing at execution time from an instruction translation lookaside buffer of a hardware processor, and prevent execution of the translated instruction by the hardware processor on detection of the modification to the virtual to physical address mapping of the instruction after the translation, wherein the store of the virtual to physical address mapping existing at translation time comprises a store of a value indicating a physical page at translation time for the translated instruction, and the check for the modification comprises a comparison of the value indicating the physical page at translation time for the translated instruction to a value from the instruction translation lookaside buffer indicating a physical page at execution time for the translated instruction.

2. The apparatus of claim 1, wherein the consistency hardware manager is to cause the hardware processor to execute the instruction on detection of the modification to the virtual to physical address mapping after the translation.

3. The apparatus of claim 1, wherein the hardware binary translator is to retranslate the instruction for execution on the hardware processor on detection of the modification to the virtual to physical address mapping after the translation.

4. The apparatus of claim 1, wherein the consistency hardware manager is also to prevent execution of the translated instruction by the hardware processor on detection of a modification to data at a physical address of the instruction after the translation.

5. An apparatus comprising:
    a data storage device that stores code that when executed by a hardware processor causes the hardware processor to perform the following:
        translating an instruction into a translated instruction in an instruction stream, and
        inserting a second instruction into the instruction stream that, when decoded and executed, stores a virtual to physical address mapping of the instruction existing at translation time in storage; and
    a consistency hardware manager to check for a modification to a virtual to physical address mapping of the instruction after the translation by a comparison of the virtual to physical address mapping existing at translation time from the storage to a virtual to physical address mapping of the instruction existing at execution time from an instruction translation lookaside buffer of a hardware processor, and prevent execution of the translated instruction by the hardware processor on detection of the modification to the virtual to physical address mapping of the instruction after the translation, wherein the store of the virtual to physical address mapping existing at translation time comprises storing a value indicating a physical page at translation time for the translated instruction, and the check for the modification comprises comparing the value indicating the physical page at translation time for the translated instruction to a value from the instruction translation lookaside buffer indicating a physical page at execution time for the translated instruction.

6. The apparatus of claim 5, wherein the consistency hardware manager is to cause the hardware processor to execute the instruction on detection of the modification to the virtual to physical address mapping after the translation.

7. The apparatus of claim 5, wherein the data storage device further stores code that when executed by the hardware processor causes the hardware processor to perform the following:
    retranslating the instruction for execution on the hardware processor on detection of the modification to the virtual to physical address mapping after the translation.

8. The apparatus of claim 5, wherein the data storage device further stores code that when executed by the hardware processor causes the hardware processor to perform the following:
    preventing execution of the translated instruction by the hardware processor on detection of a modification to data at a physical address of the instruction after the translation.

9. A method comprising:
    translating an instruction into a translated instruction in an instruction stream;
    inserting a second instruction into the instruction stream that, when decoded and executed, stores a virtual to physical address mapping of the instruction existing at translation time in storage;
    checking for a modification to a virtual to physical address mapping of the instruction after the translation by comparing the virtual to physical address mapping existing at translation time from the storage to a virtual to physical address mapping of the instruction existing at execution time from an instruction translation lookaside buffer of a hardware processor; and
    preventing execution of the translated instruction by the hardware processor on detection of the modification to the virtual to physical address mapping of the instruction after the translation, wherein the store of the virtual to physical address mapping existing at translation time comprises storing a value indicating a physical page at translation time for the translated instruction, and the checking for the modification comprises comparing the value indicating the physical page at translation time for the translated instruction to a value from the instruction translation lookaside buffer indicating a physical page at execution time for the translated instruction.

10. The method of claim 9, further comprising executing the instruction on detection of the modification to the virtual to physical address mapping after the translation.

11. The method of claim 9, further comprising retranslating the instruction for execution on the hardware processor on detection of the modification to the virtual to physical address mapping after the translation.

12. The method of claim 9, further comprising preventing execution of the translated instruction by the hardware processor on detection of a modification to data at a physical address of the instruction after the translation.

13. An apparatus comprising:
a hardware processor; and
a data storage device that stores code that when executed by the hardware processor causes the hardware processor to perform the following:
translating an instruction into a translated instruction in an instruction stream,
inserting a second instruction into the instruction stream that, when decoded and executed, stores a virtual to physical address mapping of the instruction existing at translation time in storage,
checking for a modification to a virtual to physical address mapping of the instruction after the translation by comparing the virtual to physical address mapping existing at translation time from the storage to a virtual to physical address mapping of the instruction existing at execution time from an instruction translation lookaside buffer of the hardware processor, and
preventing execution of the translated instruction by the hardware processor on detection of the modification to the virtual to physical address mapping of the instruction after the translation, wherein the store of the virtual to physical address mapping existing at translation time comprises storing a value indicating a physical page at translation time for the translated instruction, and the checking for the modification comprises comparing the value indicating the physical page at translation time for the translated instruction to a value from the instruction translation lookaside buffer indicating a physical page at execution time for the translated instruction.

14. The apparatus of claim 13, wherein the data storage device further stores code that when executed by the hardware processor causes the hardware processor to perform the following:
executing the instruction on detection of the modification to the virtual to physical address mapping after the translation.

15. The apparatus of claim 13, wherein the data storage device further stores code that when executed by the hardware processor causes the hardware processor to perform the following:
retranslating the instruction for execution on the hardware processor on detection of the modification to the virtual to physical address mapping after the translation.

16. The apparatus of claim 13, wherein the data storage device further stores code that when executed by the hardware processor causes the hardware processor to perform the following:
preventing execution of the translated instruction by the hardware processor on detection of a modification to data at a physical address of the instruction after the translation.

* * * * *